(12) United States Patent
Ehlen et al.

(10) Patent No.: US 10,029,214 B2
(45) Date of Patent: Jul. 24, 2018

(54) CERAMIC HOLLOW FIBRE MEMBRANES WITH IMPROVED MECHANICAL PROPERTIES

(71) Applicant: Mann+Hummel GMBH, Ludwigsburg (DE)

(72) Inventors: Frank Ehlen, Neunkirchen (DE); Tobias Woerz, Leutenbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 115 days.

(21) Appl. No.: 15/007,721

(22) Filed: Jan. 27, 2016

(65) Prior Publication Data

US 2016/0136582 A1    May 19, 2016

Related U.S. Application Data

(63) Continuation of application No. PCT/EP2014/065323, filed on Jul. 17, 2014.

(30) Foreign Application Priority Data

Jul. 31, 2013  (DE) ........................ 10 2013 012 671

(51) Int. Cl.
| | |
|---|---|
| *B01D 69/08* | (2006.01) |
| *C02F 1/44* | (2006.01) |
| *B01D 71/04* | (2006.01) |
| *B01D 61/14* | (2006.01) |
| *B01D 67/00* | (2006.01) |
| *B01D 71/02* | (2006.01) |
| *B01D 53/22* | (2006.01) |

(52) U.S. Cl.
CPC ......... *B01D 69/087* (2013.01); *B01D 53/228* (2013.01); *B01D 61/145* (2013.01); *B01D 61/147* (2013.01); *B01D 67/0048* (2013.01); *B01D 71/02* (2013.01); *B01D 71/021* (2013.01); *B01D 71/024* (2013.01); *B01D 71/025* (2013.01); *B01D 71/04* (2013.01); *C02F 1/444* (2013.01); *B01D 2325/24* (2013.01)

(58) Field of Classification Search
None
See application file for complete search history.

(56) References Cited

U.S. PATENT DOCUMENTS

| | | |
|---|---|---|
| 6,887,304 B2 | 5/2005 | Stroh et al. |
| 8,784,664 B2 | 7/2014 | Fislage |
| 8,840,711 B2 | 9/2014 | Schirrmeister |

FOREIGN PATENT DOCUMENTS

| | | |
|---|---|---|
| CN | 101456744 A | 6/2009 |
| CN | 101905121 A | 12/2010 |
| CN | 102515817 A | 6/2012 |
| CN | 102688702 A | 9/2012 |
| WO | 2008016292 A1 | 2/2008 |

*Primary Examiner* — Krishnan S Menon

(74) *Attorney, Agent, or Firm* — James Hasselbeck

(57) ABSTRACT

A method for the manufacture of ceramic hollow fiber membranes in a spinning process by using a spinning mass, comprising the steps: providing a spinning mass formulation; providing a secondary phase; adding the secondary phase to the spinning mass formulation; manufacturing the ceramic hollow fiber membranes in a spinning process.

5 Claims, No Drawings

CERAMIC HOLLOW FIBRE MEMBRANES WITH IMPROVED MECHANICAL PROPERTIES

TECHNICAL FIELD

The present invention relates generally to ceramic hollow fiber membranes. In particular, the present invention relates to such hollow fiber membranes which have improved mechanical properties. Furthermore, the present invention relates to a method for the manufacture of such hollow fiber membranes.

BACKGROUND OF THE INVENTION

Filter or separation methods are of great economic importance for the concentration and separation of gases and liquids. In this field, membrane technology is used to a constantly increasing extent. In this instance, the use of hollow fiber membranes in a fiber or concentration process has a number of advantages.

Since the relationship between surface and volume is relatively high, the efficiency of the concentration or fiber process will also be high; moreover, the method is easily carried out and adapted to the respective requirements.

Previous commercially common hollow fiber membranes were made out of polymer material and, as a result, have been sensitive to corrosive conditions and higher temperatures. For this reason, soon ceramic hollow fiber membranes were manufactured by condensing steam on a carbon wire and by subsequently removing the wire.

The methods for the manufacture of ceramic hollow fibers known today include a spinning process in which, in a first step, elastic green fibers are manufactured out of a spinnable mass including precursors of the ceramic material and out of polymer. Subsequently, the polymer content is burned at high temperatures and pure ceramic hollow fibers result.

Owing to the structural properties and their geometry, the ceramic hollow fiber membranes reach, on the basis of metal alloys, for example, $Al_2O_3$, only low strength values. For this reason, for example, the breaking force in the 3-point bending test only lies at approximately 6 N, which, when converted, equates to a flexural strength of approximately 33 MPa.

High mechanical stresses of the hollow fiber membranes occur particularly during handling and further processing (for example, in modular construction) and when transporting the hollow fibers (as individual elements or in the form of a module) and during operation at pressure surges or pressure gradients so that, in this instance, partially high reject rates are recorded. Particularly complex is the removal of defects, for example, fiber fractures during transport when the hollow fibers are already installed in a module.

In this regard, the publication DE 10 2009 038 814 A1 discloses a modular element, including a high temperature stable base body having at least one continuous opening for inserting a ceramic capillary membrane, and the publication EP 0 941 759 A1 describes a method for the manufacture of a hollow fiber membrane module.

It is known from the publication CN 102515817 A to manufacture ceramic hollow fiber membranes having a high filter flow rate. In this instance, the composition of these fibers are (in wt %) 40-80 parts powdered Aluminum silicate hydrate, 10-20 parts powdered soft refractory clay, 1-10 parts powdered albite, 1-10 parts powdered dolomite, 6-10 parts powdered borosilicate glass powder, 1-7 parts carboxymethyl cellulose and 1-3 parts glycerol. The outer diameter of these fibers is 3-6 mm, the inner diameter is 1-2 mm and the length of the fibers is 100-1000 mm. The total porosity is 50-60%, the flow rate of water is 10,000-12,500 $l/m^2$ hMPa and the flexural strength is at 35-85 MPa.

SUMMARY OF THE INVENTION

For this reason, it is the object of the present invention to provide ceramic hollow fiber membranes having improved mechanical properties while retaining the porosity and flux output of previous hollow fiber membranes.

Advantageous embodiments of the present invention are set out in the dependent claims.

In a particular embodiment of the present invention, the secondary phase is a glass phase.

In a preferred embodiment of the present invention, the glass phase is a nanoscale illite.

The hollow fiber membranes according to the present invention are particularly suitable for microfiltration, ultrafiltration, nanofiltration and gas separation, in particular, in the area of water purification (waste water treatment, drinking water purification, etc.) or in the oil-water separation as it is used in the oil and gas industry.

DESCRIPTION OF THE INVENTION

Hollow fiber membranes are manufactured in a spinning process by using a spinning mass, the spinning mass as a base formulation being made up of solvents, polymer and ceramic powder (aluminum oxide) and a dispersant for stabilizing the suspension. Usually, an increased strength of such hollow fiber membranes results in a lower porosity and, for this reason, also in a lower filtering performance.

It has been discovered that the addition of a secondary phase to the base formulation of a ceramic hollow fiber for the manufacture of ceramic hollow fiber membranes on the basis of an oxide ceramic material, for example, aluminum oxide, $ZrO_2$ or $TiO_2$, or on the basis of a non-oxide ceramic material, for example, $Si_3N_4$, AlN or WC are counteracting this development. Preferably, the secondary phase is made up of a glass phase which is added in the amount of approximately 0.5-10% based on the total solid matter.

Particularly suitable as a glass phase is nanoscaled (thus, in the range of 1 through 200 nm) illite, a naturally occurring three-layer sheet silicate, having the chemical major constituents 47.0%±3.5% $SiO_2$, 21.0%±2.0% $Al_2O_3$, 7.0%±1.0% $Fe_2O_3$, 4.0%±2.0% CaO, 5.5%±0.7% $K_2O$, 3.0%±0.75% MgO, 0.15%±0.05% $Na_2O$, 0.8%±0.1% $TiO_2$, 0.3%±0.08% $P_2O_5$, 11.0%±2.0% TI (total impurity). Alternatively to illite, synthetic glass powders or natural clay minerals may also be used.

The conventional ceramic hollow fibers on the basis of aluminum oxide are mostly manufactured by a wet spinning method, the employed three-component system made of the solvent, the employed polymer and the precipitating agent having a miscibility gap, the reason of which the polymer dissolved in the spinning mass solidifies upon contact with the precipitating agent. By this process, the ceramic particles are embedded in the polymer matrix. After a drying step, the green compact manufactured that way still is made up of polymer and aluminum oxide. Subsequently, a sintering process occurs to bond the ceramic particles by the formation of sintering necks and to burn off the polymer, as a result of which a porous ceramic membrane is manufactured.

The introduction of the secondary phase (glass phase) into the spinning mass according to the present invention, green compacts, which are made up of polymer, aluminum oxide and the glass phase, are successfully manufactured. The hollow fiber membranes subsequently manufactured by the sintering process have strength values which at approximately 13 N are twice as high as in conventionally manufactured hollow fiber membranes, the geometric fiber dimensions (outer diameter 0.8-5.0 mm, inner diameter 0.5-4.8 mm), the pore structure, the total porosity (40-60%) and the pure water permeability (10,000-30,000 l/m$^2$/h/bar) of the glass-free systems being able to be maintained. Thus, for this reason, one succeeds in achieving substantially higher strength values (>30%) than have been possible, for example, by adding synthetically manufactured glass frits made up of ground glass powder.

By substantially increasing the mechanical stability achievable by the present invention, the reject rates and, for this reason, the costs, which may arise from handling, further processing and transporting, can be significantly reduced.

Such hollow fiber membranes according to the present invention are particularly suitable for microfiltration, nanofiltration, ultrafiltration and gas separation in the area of water purification (waste water treatment, drinking water purification, etc.). Further areas of application are filtrations in the food and beverage industry and in the chemical industry or the oil and gas industry.

A reduction of the sintering temperature to 200 degrees Celsius during the manufacture is possible, the mechanical stability then being at a comparable level to the pure ceramic systems. In this manner, energy is conserved when manufacturing hollow fiber membranes in which the mechanical properties obtained without the addition of the glass phase are sufficient.

If the glass phase in the structure of the hollow fiber membrane is, during the later operation in aggressive, for example, hot lyes at pH 14, partially or even completely removed, the basic mechanical strength is maintained at the level of glass-free systems, that is, the mechanical stability does not fall below values which are obtained without the addition of the glass phase.

What is claimed is:

1. A method for the manufacture of ceramic hollow fiber membranes in a spinning process by using a spinning mass, comprising the steps:

providing a spinning mass formulation for manufacture of the ceramic hollow fiber membranes,
  the spinning mass formulation including a ceramic powder having at least one oxide ceramic material;
providing a secondary phase,
  wherein the secondary phase consists of nanoscale illite;
adding the secondary phase to the spinning mass formulation;
manufacturing the ceramic hollow fiber membranes in a spinning process.

2. The method according to claim 1, wherein
the spinning mass formulation for the manufacture of the ceramic hollow fiber membranes, the at least one oxide ceramic material is aluminium oxide, ZrO2 and/or TiO2.

3. The method according to claim 1, wherein
in the step of providing a spinning mass formulation, the spinning mass formulation is made of a solvent, a polymer and the ceramic powder;
wherein after the step of adding the secondary phase to the spinning mass formulation, the method includes the steps of:
  injecting the spinning mass formulation into a precipitation bath,
  solidifying the polymer upon contact with a precipitating agent to form a green body; and
  sintering of the obtained green body to bond the ceramic particles together and to burn out the polymer, resulting in the ceramic hollow fiber membranes.

4. The method according to claim 1, wherein
in the step of providing a secondary phase, the secondary phase is a glass phase.

5. The method according to claim 1, wherein
in the step of adding the secondary phase to the spinning mass formulation, the secondary phase is added in an amount of 0.5 to 10% weight % based on a total solid matter.

* * * * *